J. C. JACKSON.
AUTOMOBILE CONSTRUCTION.
APPLICATION FILED JUNE 6, 1914.
1,126,476.
Patented Jan. 26, 1915.
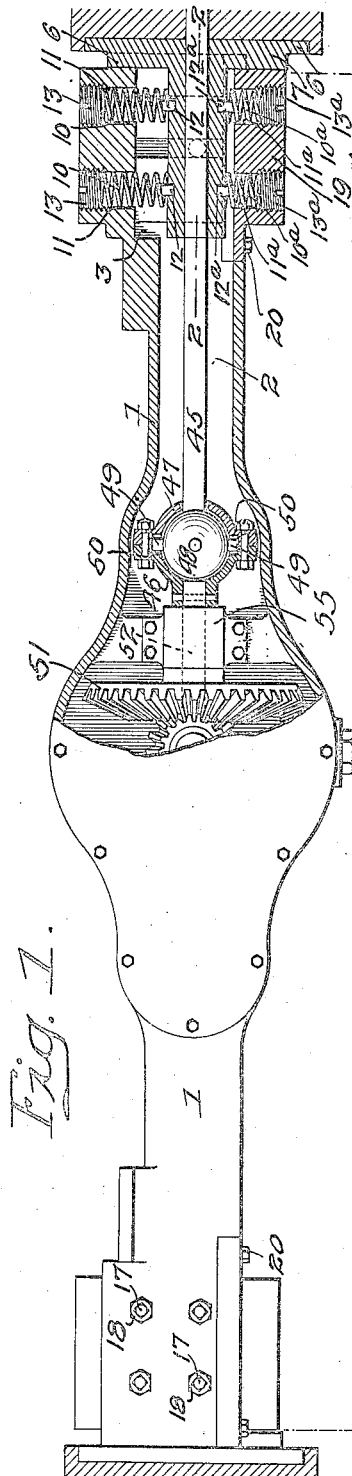
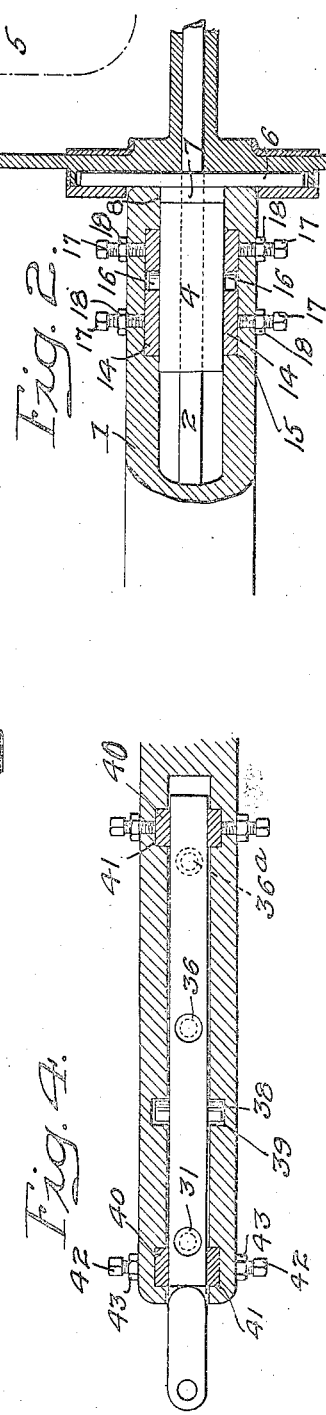
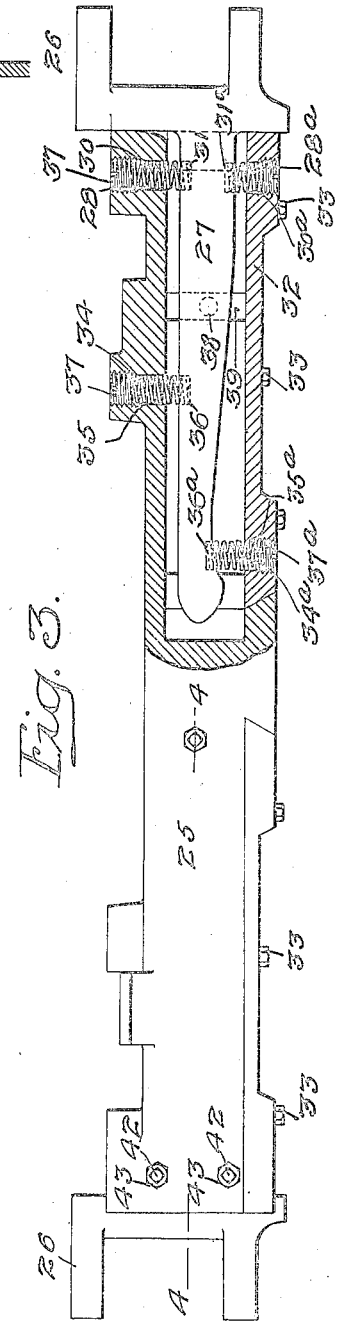
Inventor:—
John C. Jackson,
by his Attorneys

UNITED STATES PATENT OFFICE.

JOHN C. JACKSON, OF PHILADELPHIA, PENNSYLVANIA.

AUTOMOBILE CONSTRUCTION.

1,126,476.  Specification of Letters Patent.  Patented Jan. 26, 1915.

Application filed June 6, 1914. Serial No. 843,407.

*To all whom it may concern:*

Be it known that I, JOHN C. JACKSON, a citizen of the United States, residing in Philadelphia, Pennsylvania, have invented certain Improvements in Automobile Construction, of which the following is a specification.

My invention relates to the running gear of automobiles, and consists of improved supporting means for the wheels.

My improved construction is designed to prevent excessive vibration of the car and, in some instances, the necessity of employing pneumatic tires may be avoided.

My invention comprises a special form of spring box construction for the wheel carrying means.

These and other features of my invention will be more fully described hereinafter, reference being had to the accompanying drawings, in which:

Figure 1, is a view partly in section and partly in elevation of the rear axle and axle casing, and wheel supporting means carried thereby; Fig. 2, is a sectional plan view on the line 2—2, Fig. 1; Fig. 3, is a view partly in section and partly in elevation of the front axle and axle frame and the wheel supporting means carried thereby, and Fig. 4, is a sectional plan view on the line 4—4, Fig. 3.

The rear wheel supporting means comprises an axle casing or frame 1, which has a through opening or bore 2; the latter being enlarged at the end, as at 3, for the reception of a bearing member or block 4 carried by or connected to the rear wheel, a portion of which is shown at 5. This bearing member or block 4 is free to move vertically with respect to the frame or axle casing 1, and at its outer end it is preferably provided with an annular plate 6; such annular plate having a vertical projection 7 in line with the bearing member or block 4; which projection is disposed in a groove 8 at the end of the axle casing and is adapted to slide therein.

Springs 10 and 10ª are carried by the ends of the axle frame above and below the bearing member or block 4, respectively; such springs being preferably guided by sockets 11 and 11ª in the frame, and by pins 12 and 12ª carried by the bearing number or block 4. Tension may be imparted to these springs by adjustable screws 13 and 13ª carried by the axle casing and closing the ends of the guiding sockets. To maintain the bearing member or block 4 in a central position and avoid looseness laterally from wear, I provide gibs or wear-plates 14 which are placed within the enlarged end of the axle frame or casing on both sides of the bearing member or block 4; said casing being recessed at 15 to receive said plates; and to prevent endwise movement of the bearing member or block 4, the latter is provided with pins or lugs 16 disposed between said gibs or wear plates and adapted to slide between the same during any up and down motion of said bearing member or block 4. The gibs or wear plates are laterally adjustable, any wear upon the same or the extension 4 being compensated for and taken up by means of set screws 17 passing through the wall of the axle casing; such set screws having locking nuts 18.

The ends of the axle casing are provided with covers 19 for the enlarged recesses in which the springs are mounted; the latter thereby forming substantially a spring-box for the wheels, and this cover; which has the recesses or sockets 11ª for the springs 10ª may be held to the casing by suitable means, such as the bolts or screws 20.

The construction of the wheel supporting means carried by the front axle is substantially similar to the rear axle; the details of such construction being as follows: The front axle 25 carries the usual yoke members 26 to which the knuckle-joint supports for the front wheels (not shown) are attached in the usual manner. The ends of this axle are hollow, and adapted to said hollow ends are extensions 27 carried by said yoke members, which extensions are spring supported by said axle. In the present instance, I employ a spring 28 adjacent the end of the axle and above the extension 27, which spring is guided by a socket 30 formed in the axle casing and by a socket 31 formed in the extension. Below the spring 28 is a spring 28ª, the upper end of which is guided in a socket 31ª formed in the extension, while its lower end is guided in a socket or recess 30ª formed in a cover member or closure 32 which may be secured to the hollow portion of the axle by bolts or screws 33. Additional springs 34 and 34ª are mounted with respect to the extension 27; the spring 34 being disposed above the latter and adapted to a socket or recess 35 in the axle casing and to a socket 36 in the extension; while the spring 34ª is disposed near the end of the extension and is adapted to a socket or recess 35ª in the cover 32, and a socket 36ª formed in the extension. In each instance the springs are adjustably held in place by screws 37 and 37ª carried by the axle casing and the cover.

To prevent endwise movement of the extension and the wheel carried thereby; the extension is provided with pins or lugs 38 adapted to slots 39 formed in the axle casing in which said pins are movable with respect to said axle casing. To prevent lateral wear on the extension, I provide gibs or wear-plates 40 which are set in recesses 41 formed in the walls of the axle casing adjacent both ends of the extension 27, said gibs being held in place and adjusted by set screws 42 and lock nuts 43.

With a construction such as I have devised it is desirable to provide the rear driving shaft 45 which passes through the rear axle frame or casing and the bearing member or block 4, with a flexible connection, and in the present instance this consists of a socket which may be formed of two half shells 46 and 47, of suitable construction, which is movably mounted with respect to the axle frame; a ball 48 being connected to the end of the driving shaft 45 and disposed in said socket. This ball has pins 49 projecting from its surface adapted to sockets 50 formed in the shell of the socket; the construction being such that while the pins serve to rotate the shell; they are free to rock in the sockets of said casing. The bevel gear wheel 51 forming part of the usual gearing is carried by a shaft 52, operatively connected to the half shell 46 by suitable means; the shaft 52 carrying said bevel gear being journaled in a bearing 55.

While I have shown one side only of the structure in section, it will be understood that both sides are alike in all particulars.

While I have shown and described the use of springs as cushion members, it will be understood that blocks of rubber or similar resilient material may be employed in lieu thereof. It will be understood further that I do not wish to be limited to the number of springs shown, nor to their weight or supporting power; since different weights of cars will require greater or less number of springs and greater or less supporting value.

I claim:

1. The combination of an axle casing, a wheel, a tubular bearing member having a plate at its outer end, said plate being vertically slidably guided on the end of the axle casing, an axle journaled in said bearing member, means between an intermediate portion of the bearing member and a corresponding portion of the casing for retaining said bearing member within the casing against endwise movement, and springs mounted in the casing and supporting said bearing member.

2. The combination of an axle casing, a wheel, a tubular bearing member passing into the axle casing and having an annular plate at its outer end, said plate having a projecting portion vertically guided on the end of the casing, an axle journaled in said bearing member and extending therethrough, means between an intermediate portion of the bearing member and a corresponding portion of the casing, for retaining said bearing member within said casing against endwise movement, and a plurality of springs mounted in said casing and disposed above and below said bearing member, the lower springs adapted to support said member.

3. The combination of an axle casing, a wheel, a tubular bearing member having a plate at its outer end, said plate having a projecting portion engageable in a groove in the end of the bearing member, whereby the plate is vertically guided relatively to said member, a plurality of springs in said casing above and below the bearing member, said casing being enlarged at the outer end to receive said bearing member, and guiding means for the springs.

4. The combination of an axle casing, a wheel, a bearing member passing into said axle casing, a plurality of springs mounted in said casing above and below the bearing member, guiding means for said springs, guiding means for the bearing member with respect to the axle casing, wear plates carried by the axle casing adjacent the bearing member, and means for maintaining said wear plates in engagement with the bearing member.

5. The combination of an axle casing, a wheel, a bearing member disposed within said axle casing, a plurality of coiled springs mounted in said casing above and below said bearing member, guiding means for said springs, guiding means for the bearing member with respect to the axle casing, a plurality of wear plates carried by the axle casing, and means for maintaining said wear plates in working engagement with the bearing member, and co-acting means between intermediate portions of the sides of the bearing member and the corresponding portions of the inner sides of the casing for retaining the bearing member within the axle casing.

In testimony whereof, I have signed my name to this specification, in the presence of two subscribing witnesses.

JOHN C. JACKSON.

Witnesses:
MURRAY C. BOYER,
JOS. H. KLEIN.